(12) United States Patent
Park

(10) Patent No.: US 8,610,390 B2
(45) Date of Patent: Dec. 17, 2013

(54) METHOD AND APPARATUS FOR CONTROLLING TORQUE OF AN ELECTRIC MOTOR DRIVEN VEHICLE

(75) Inventor: Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 13/297,585

(22) Filed: Nov. 16, 2011

(65) Prior Publication Data

US 2012/0299518 A1 Nov. 29, 2012

(30) Foreign Application Priority Data

May 24, 2011 (KR) .................. 10-2011-0049156

(51) Int. Cl.
*H02P 7/00* (2006.01)
*H02K 17/32* (2006.01)

(52) U.S. Cl.
USPC ........................................ 318/434; 318/432

(58) Field of Classification Search
USPC ................................. 318/432, 434
See application file for complete search history.

(56) References Cited

U.S. PATENT DOCUMENTS

| 5,905,349 A * | 5/1999 | Farkas et al. .................. 318/432 |
| 7,345,443 B2 * | 3/2008 | Yoshiura et al. .............. 318/432 |
| 2007/0278021 A1 * | 12/2007 | Pott et al. ...................... 180/65.2 |
| 2009/0321166 A1 * | 12/2009 | Falkenstein et al. ..... 180/65.285 |
| 2010/0286855 A1 * | 11/2010 | Yang ............................... 701/22 |

FOREIGN PATENT DOCUMENTS

| JP | 2007-274781 A | 10/2007 |
| JP | 2007-326411 A | 12/2007 |

* cited by examiner

*Primary Examiner* — Eduardo Colon Santana
*Assistant Examiner* — Devon Joseph
(74) *Attorney, Agent, or Firm* — Edwards Wildman Palmer LLP; Peter F. Corless

(57) ABSTRACT

Disclosed herein is a technique for controlling the torque of an electric motor driven vehicle. In the technique, the current speed of a drive motor, a speed boundary section, a target torque, a drive torque limit and a generation torque limit are input. The ratio of the current speed in the entire speed boundary section is calculated as a mixture ratio when the current speed is within the speed boundary section. A limit torque is calculated, reflecting the drive torque limit and the generation torque limit in the calculated mixture ratio. Of the limit torque and the target torque, the torque that is smaller in absolute value is determined as the final torque that is required of the drive motor.

12 Claims, 3 Drawing Sheets

METHOD AND APPARATUS FOR CONTROLLING TORQUE OF AN ELECTRIC MOTOR DRIVEN VEHICLE

CROSS-REFERENCE TO RELATED APPLICATIONS

This application claims under 35 U.S.C. §119(a) priority to Korean Application No. 10-2011-0049156, filed on May 24, 2011, the disclosure of which is incorporated herein by reference in its entirety.

BACKGROUND OF THE INVENTION

1. Field of the Invention

The present invention relates to method and apparatus for stably controlling torque of an electric motor driven vehicle, such as an electric vehicle or a hybrid vehicle.

2. Description of the Related Art

Due to increased demand for environment-friendly vehicles, the development of vehicles which have electric motors to generate a drive force has increased. For example, hybrid vehicles use both a gas engine and an electric motor to provide drive force to a vehicle, and electric vehicles or fuel cell vehicles use only electric motors to provide drive force to the vehicles.

The present invention relates to method and apparatus for controlling the torque output from an electric motor of an electric motor driven vehicle, such as a hybrid vehicle, an electric vehicle or a fuel cell vehicle.

Electric motor driven vehicles generally receive drive force from batteries. Therefore, in these types of vehicles, torque from a drive motor must be controlled relative to the SOC (state of charge) of the battery and the current rotational speed of the electric motor. Furthermore, because a point of time of charge and a point of time of generation that pertain to the electric motor vary depending on the state of the battery, the final torque of the drive motor is determined depending on a drive torque limit and a generation torque limit. Therefore, the final torque which is required of the drive motor from the control unit must be determined in the form of an efficient and stable value, taking into account the current rpm of the electric motor, the target torque of the electric motor that is required from a user, a drive torque limit and a generation torque limit of the drive motor depending on the state of the battery or the engine, etc.

However, in the conventional technique, a difference between the drive torque limit and the generation torque limit of the drive motor may become excessively large depending on the operation of the battery or other equipment. In this case, when the drive motor is operated around a section of a boundary between a drive state and a generation state, a phenomenon in which the final torque for controlling the drive motor severely fluctuates occurs. This phenomenon directly affects the stability of the vehicle when driven. Hence, a technique is required, in which the final torque can be always determined in the form of a stable value in the charge section and the discharge section despite sudden changes in surrounding conditions.

It is to be understood that the foregoing description is provided to merely aid understanding of the present invention, and does not mean that the present invention falls under the purview of the related art which was already known to those skilled in the art.

SUMMARY OF THE INVENTION

Accordingly, the present invention has been made keeping in mind the above problems occurring in the prior art, and an object of the present invention is to provide a method and apparatus for controlling torque of an electric motor driven vehicle which prevents the final torque from fluctuating when controlling the torque of a drive motor.

In order to accomplish the above object, in an aspect, the present invention provides a method for controlling torque of an electric motor driven vehicle, including: receiving a current speed of a drive motor, a speed boundary section, a target torque, a drive torque limit and a generation torque limit; calculating a ratio of the current speed in the entire speed boundary section as a mixture ratio when the current speed is within the speed boundary section; calculating a limit torque, reflecting the drive torque limit and the generation torque limit in the calculated mixture ratio; and selecting whichever of the limit torque and the target torque is smaller in absolute value as a final torque that is required of the drive motor.

The speed boundary section may include a lowest boundary limit and an uppermost boundary limit, and the calculating of the ratio of the current speed may include calculating the mixture ratio in such a way that a difference between the current speed and the lowest boundary limit is divided by a value of the entire speed boundary section.

The speed boundary section may include a lowest boundary limit and an uppermost boundary limit, and the calculating of the ratio of the current speed may comprise calculating the mixture ratio using equation 1:

$$\text{mixture ratio} = \frac{\text{current speed} \times \text{sign(target torque)} - \text{lowest boundary limit value}}{\Delta \text{ speed boundary section}}.$$

The speed boundary section may include a lowest boundary limit and an uppermost boundary limit, and the calculating of the limit torque may include calculating the limit torque, reflecting the drive torque limit in proportion to a difference between the current speed and the lowest boundary limit and also reflecting the generation torque limit in proportion to a difference between the current speed and the uppermost boundary limit.

The speed boundary section may include a lowest boundary limit and an uppermost boundary limit, and the calculating of the limit torque may comprise calculating the limit torque using equation 2:

limit torque=(mixture ratio×drive torque limit value)+ (1−mixture ratio)×(generation torque limit value)

The selecting may comprise calculating the final torque using equation 3:

final torque=MIN(limit torque,|target torque|)×sign (target torque).

The speed boundary section may include a lowest boundary limit and an uppermost boundary limit, the calculating of the ratio of the current speed may include calculating the mixture ratio using equation 1, the calculating of the limit torque may include calculating the limit torque using equation 2, and the selecting may include calculating the final torque using equation 3, $$\text{mixture ratio} = \frac{\text{current speed} \times \text{sign(target torque)} - \text{lowest boundary limit value}}{\Delta \text{ speed boundary section}} \quad \text{Equation 1}$$

$$\text{limit torque} = (\text{mixture ratio} \times \text{drive torque limit value}) + \\ (1 - \text{mixture ratio}) \times (\text{generation torque limit value}) \quad \text{Equation 2}$$

$$\text{final torque} = \\ \text{MIN (limit torque, |target torque|)} \times \text{sign(target torque)}. \quad \text{Equation 3}$$

In another aspect, the present invention provides a method for controlling torque of an electric motor driven vehicle, including: receiving a current speed of a drive motor, a speed boundary section having a lowest boundary limit and an uppermost boundary limit, a target torque, a drive torque limit and a generation torque limit; calculating a limit torque, reflecting the drive torque limit and the generation torque limit in a ratio of the current speed in the speed boundary section; and selecting whichever of the limit torque and the target torque is smaller in absolute value, as a final torque that is required of the drive motor.

The calculating of the limit torque may include calculating the limit torque, reflecting the drive torque limit in proportion to a difference between the current speed and the lowest boundary limit, and also reflecting the generation torque limit in proportion to a difference between the current speed and the uppermost boundary limit.

In a further aspect, the present invention provides an apparatus for controlling torque of an electric motor driven vehicle, including: a drive motor providing drive force to the electric motor driven vehicle; and a control unit calculating a final torque required of the drive motor using a current speed of the drive motor, a speed boundary section including a lowest boundary limit and an uppermost boundary limit, a target torque, a drive torque limit and a generation torque limit, wherein the control unit calculates a limit torque, reflecting the drive torque limit and the generation torque limit in response to a ratio of the current speed in the speed boundary section, and selects whichever of the limit torque and the target torque is smaller in absolute value as the final torque that is required of the drive motor.

The control unit may calculate the limit torque, reflecting the drive torque limit in proportion to a difference between the current speed and the lowest boundary limit, and also reflecting the generation torque limit in proportion to a difference between the current speed and the uppermost boundary limit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
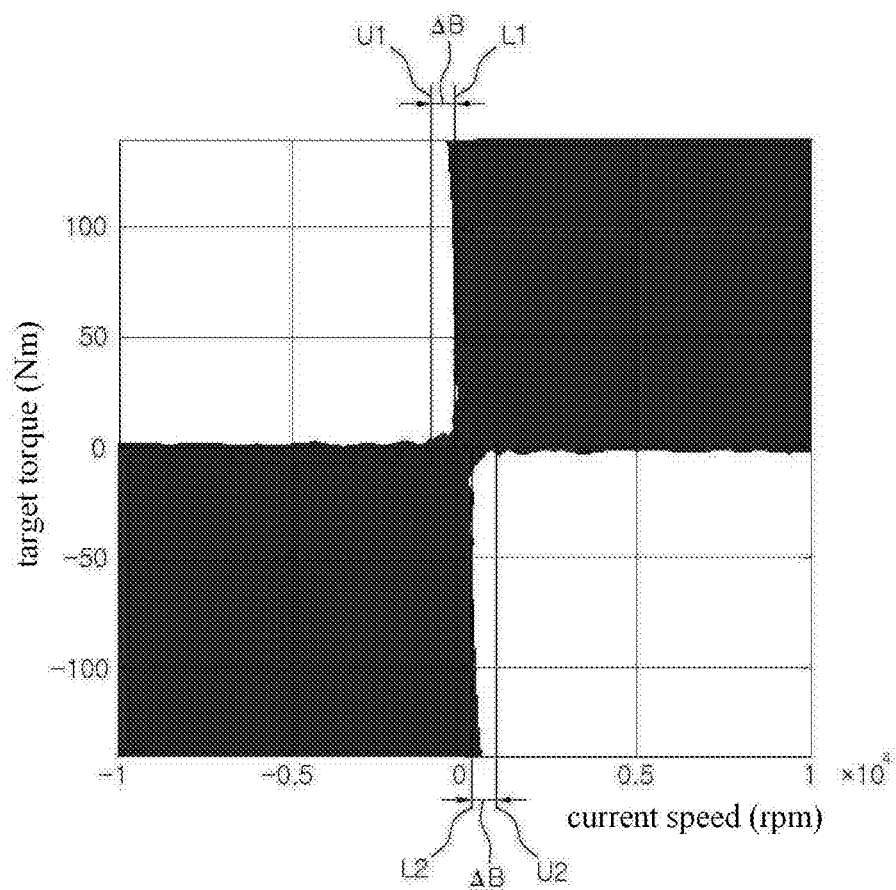
FIG. 1 is a graph showing a speed boundary section in a method and apparatus for controlling torque of an electric motor driven vehicle, according to an exemplary embodiment of the present invention.

Hereinafter, a method and apparatus for controlling torque of an electric motor driven vehicle according to a preferred embodiment of the present invention will be described in detail with reference to the attached drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The system and method for controlling the torque of the electric motor driven vehicle according to the present invention includes: receiving a current speed of a drive motor, a speed boundary section, a target torque, a drive torque limit and a generation torque limit; calculating a ratio of the current speed in the entire speed boundary section as a mixture ratio when the current speed is within the speed boundary section; calculating a limit torque, reflecting the drive torque limit and the generation torque limit in the calculated mixture ratio; and selecting whichever of the limit torque and the target torque is smaller in absolute value as a final torque that is required of the drive motor.

To control the output of the drive motor of the vehicle, a final torque to be generated by the drive motor is input. The final torque is determined by taking into account variables, such as a generation torque limit, a drive torque limit determined by a current speed of the electric motor and a SOC (state of charge) of the battery, a target torque determined by a user, etc. A command to generate the determined final torque is input to the drive motor.

However, if there is a significant variation in an input value of the final torque, the output of the drive torque goes beyond the bounds of the control and thus may become unstable. In particular, if there are sudden and large variations in the drive torque limit and the generation torque limit which act as restrictive conditions for the drive motor, rapid variations in calculation of the final torque may result, thus causing the vehicle to become wobbly. Therefore, a technique is required, in which even when there are sudden and large variations in the drive torque limit and the generation torque limit, an appropriate final torque is calculated and input which smoothly varies.

To control such a final torque, a current speed of the drive motor, a speed boundary section, a target torque, a drive torque limit and a generation torque limit are input to a control unit. The term "speed boundary section" refers to a speed section in which the control proposed in the present invention is intensively required. The speed boundary section is given in FIG. 1.

FIG. 1 is a graph showing a speed boundary section (B) in method and apparatus for controlling torque of an electric motor driven vehicle, according to an embodiment of the present invention. The horizontal axis refers to the current speed of the drive motor. The vertical axis refers to the target torque of the drive motor. When the current speed and the target torque have the same sign, it means that the drive motor is in an electric discharge state (a drive state). When the current speed and the target torque have opposite signs, it means that the drive motor is in a generation state (a charging state). However, in some cases, around an area in which the current speed of the drive motor is 0 (zero), the generation or charging state of the drive motor can not precisely be determined based on the sign of the current speed, thus, there may be an error.

In other words, a dark portion in the graph indicates that the drive motor is in the drive state, and around an area in which the current speed is 0, there is generally large variations in the drive torque limit and the generation torque limit. In this case, around the area of current speed 0, even when the signs of the current speed and the target torque become different, the drive motor may still be in the drive state. Therefore, the object of the present invention is to prevent the final torque from fluctuating in such a way as to set a speed boundary section around the area of current speed 0 and determine an appropriate torque in response to a ratio of the speed in the section.

For this, the speed boundary section (B) includes lowest boundary limits L1 and L2 and uppermost boundary limits U1 and U2. The lowest boundary limit, the uppermost boundary limit and the speed boundary section may be previously set as a predetermined section. Thus, when the current speed of the drive motor is in the speed boundary section, the current speed of the drive motor, the speed boundary section, the target torque, the drive torque limit and the generation torque limit are input so as to calculate a final torque. When the current speed of the drive motor is outside of the speed boundary section, a general target torque is input to the drive motor as the final torque within the bounds of the drive torque limit and the generation torque limit.

When the current speed of the drive motor, the speed boundary section, the target torque, the drive torque limit and the generation torque limit are input to the control unit, if the current speed of the drive motor is within the speed boundary section, a mixture ratio calculation is performed in which the ratio of the current speed in the entire speed boundary section is calculated as a mixture ratio.

The term "mixture ratio" refers to a blending ratio for obtaining an appropriate limit torque from blending the drive torque limit with the generation torque limit. The mixture ratio is determined based on the position of the current speed in the speed boundary section. In detail, the mixture ratio is determined by dividing the difference between the current speed and the lowest boundary limit by the entire speed boundary section value.

After the mixture ratio has been determined, a limit torque calculation is processed. As a result of this calculation, a limit torque is determined, reflecting the drive torque limit and the generation torque limit depending on the determined mixture ratio. In detail, at the limit torque calculation, the limit torque is determined in such a way that the drive torque limit is reflected in proportion to the difference between the current speed and the lowest boundary limit, and also in such a way that the generation torque limit is reflected in proportion to the difference between the current speed and the uppermost boundary limit.

In other words, the mixture ratio can be calculated by the following equation 1. The limit torque can be calculated by the following equation 2.

$$\text{mixture ratio} = \frac{\text{current speed} \times \text{sign(target torque)} - \text{lowest boundary limit value}}{\Delta \text{ speed boundary section}} \quad \text{Equation 1}$$

$$\text{limit torque} = (\text{mixture ratio} \times \text{drive torque limit value}) + (1 - \text{mixture ratio}) \times (\text{generation torque limit value}) \quad \text{Equation 2}$$

After the limit torque is determined by the above-mentioned method, a final torque calculation is made. As a result of this calculation, of the determined limit torque and the target torque, the torque which has the smaller absolute value is determined to be the final torque which is required of the drive motor.

In other words, the final torque can be calculated by the following equation 3.

$$\text{final torque} = \text{MIN}(\text{limit torque}, |\text{target torque}|) \times \text{sign(target torque)} \quad \text{Equation 3}$$

According to this equation, of the limit torque and the absolute value of the target torque, the smaller value of the two values is selected, and the sign of the target torque is reflected to the selected smaller value, thus obtaining the final torque. Meanwhile, if the drive torque limit and the generation torque limit are always input as absolute values, there is no other choice but to express the limit torque as the absolute value. In this state, the sign of the target torque is finally reflected in the obtained result. Thus, the sign of the final torque is determined so that whether the drive motor is in the generation state or the drive state is determined.

As such, in the present invention, the drive torque limit is blended with the generation torque limit depending on the position of the current speed of the drive motor in the specific speed section which is at issue. The value resulting from this blending is then compared with the target torque, and then the smaller of the two values is determined to be the final torque of the drive motor. Therefore, even if the drive torque limit and the generation torque limit are subject to a sudden and large variation, the final torque can be prevented from unstably fluctuating.

In detail, the speed boundary section includes the lowest boundary limit and the uppermost boundary limit, and at the mixture ratio calculation step, the mixture ratio can be calculated by dividing the difference between the current speed and the lower boundary limit by the entire speed boundary section value. In other words, the speed boundary section includes the lowest boundary limit and the uppermost boundary limit, and the mixture ratio calculation step includes calculating the mixture ratio according to the following equation 1.

$$\text{mixture ration} = \frac{\text{current speed} \times \text{sign(target torque)} - \text{lowest boundary limit value}}{\Delta \text{ speed boundary section}} \quad \text{Equation 1}$$

Meanwhile, at the limit torque calculation step, the drive torque limit is reflected in proportion to the difference between the current speed and the lowest boundary limit, and the generation torque limit is reflected in proportion to the difference between the current speed and the uppermost boundary limit. Thus, the limit torque can be determined accordingly. In other words, the limit torque calculation step obtains the limit torque according to the following equation 2. Furthermore, it is preferable that the drive torque limit and the generation torque limit be input as absolute values in the equation.

$$\text{limit torque} = (\text{mixture ratio} \times \text{drive torque limit value}) + (1 - \text{mixture ratio}) \times (\text{generation torque limit value}) \quad \text{Equation 2}$$

In addition, at the final torque calculation step, the final torque can be calculated by the following equation 3.

$$\text{final torque} = \text{MIN}(\text{limit torque}, |\text{target torque}|) \times \text{sign(target torque)} \quad \text{Equation 3}$$

In other words, the speed boundary section includes the lowest boundary limit and the uppermost boundary limit. At the mixture ratio calculation step, the mixture ratio can be calculated by the following equation 1. At the limit torque calculation step, the limit torque can be calculated by the following equation 2. At the final torque calculation step, the final torque can be calculated by the following equation 3.

$$\text{mixture ratio} = \frac{\text{current speed} \times \text{sign(target torque)} - \text{lowest boundary limit value}}{\Delta \text{ speed boundary section}} \quad \text{Equation 1}$$

$$\text{limit torque} = (\text{mixture ratio} \times \text{drive torque limit value}) + (1 - \text{mixture ratio}) \times (\text{generation torque limit value}) \quad \text{Equation 2}$$

$$\text{final torque} = \text{MIN (limit torque, |target torque|)} \times \text{sign(target torque)} \quad \text{Equation 3}$$

Figure 2:
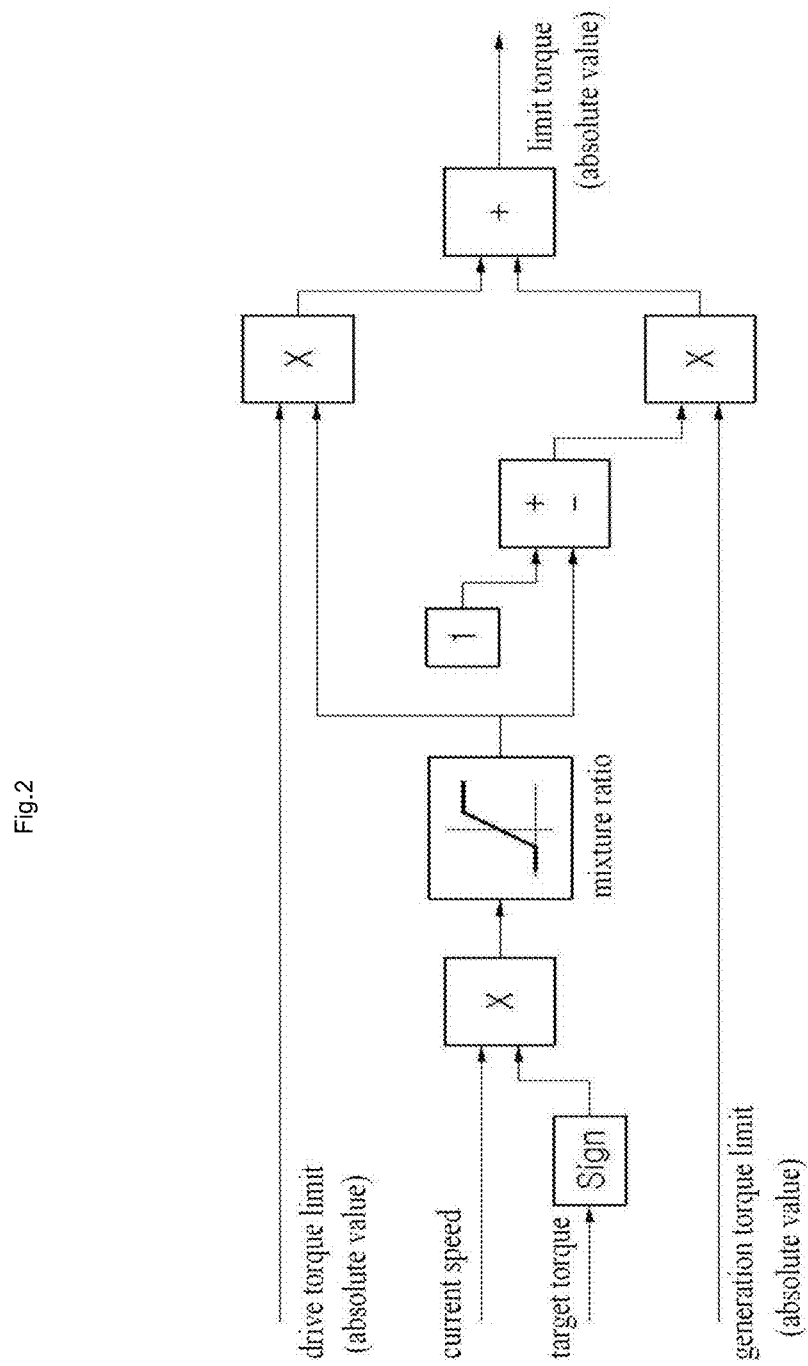
FIG. 2 is a view showing control logic of the torque control method according to the exemplary embodiment of the present invention.
Figure 3:
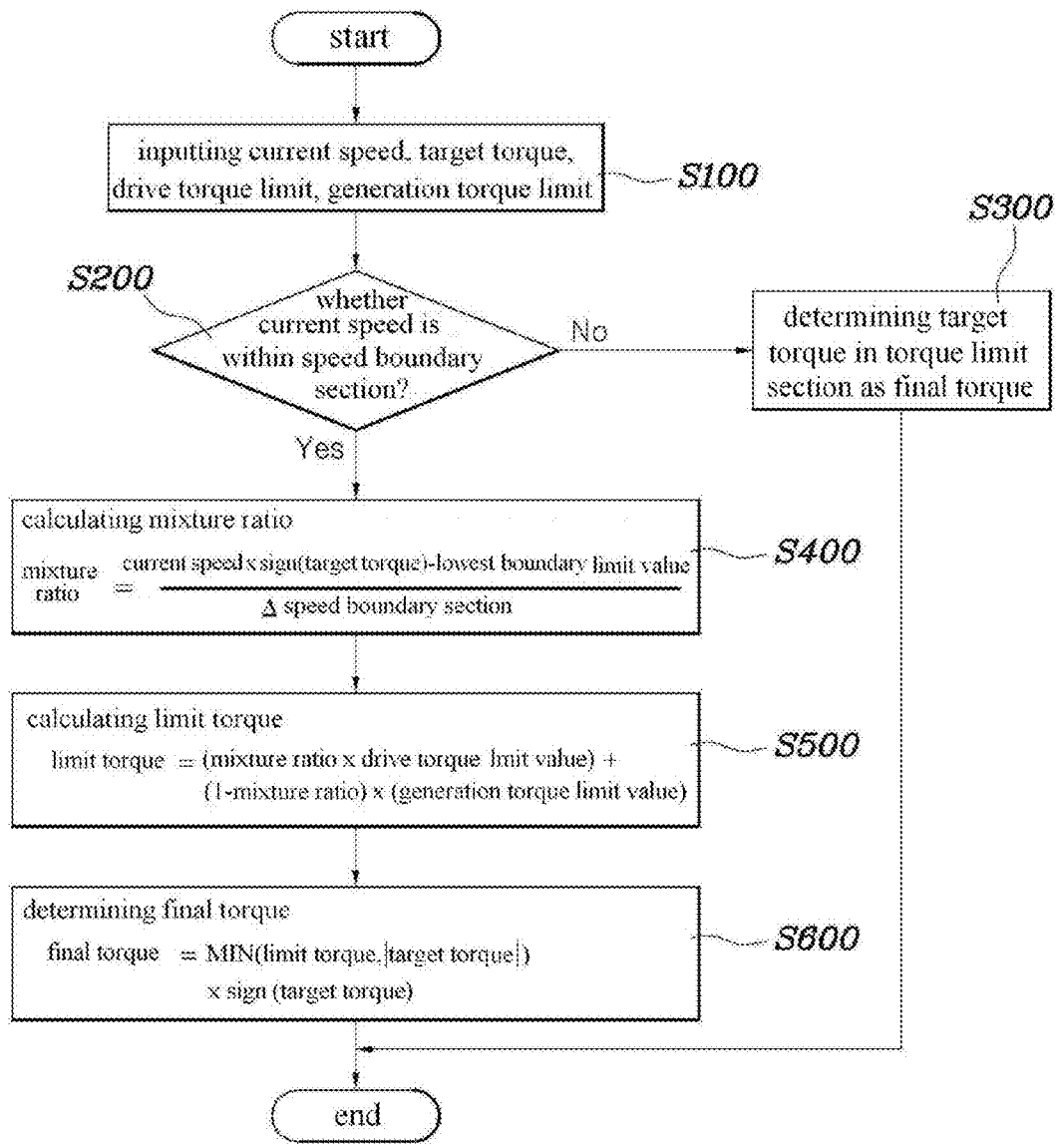
FIG. 3 is a flowchart of the torque control method of FIG. 2.

Meanwhile, as shown in FIGS. 2 and 3, in the torque control method for the electric motor driven vehicle according to the present invention, at step S100, the current speed of the drive motor, the speed boundary section including the boundary limit and the uppermost boundary limit, the target torque, the drive torque limit and the generation torque limit are input. At step S400 and S500, the limit torque is calculated, reflecting the drive torque limit and the generation torque limit depending on the ratio of the current speed in the speed boundary section. At step S600, of the limit torque and the target torque, the torque which has the smaller absolute value is determined as the final torque of the drive motor.

Furthermore, the limit torque can be obtained, reflecting both the drive torque limit in proportion to the difference between the current speed and the lowest boundary limit, and the generation torque limit in proportion to the difference between the current speed and the uppermost boundary limit.

Meanwhile, the torque control apparatus for the electric motor driven vehicle using the above-mentioned torque control method includes a drive motor and a control unit. The drive motor provides drive force to the vehicle. The control unit calculates a final torque required of the drive motor using the current speed of the drive motor, a speed boundary section including a lowest boundary limit and an uppermost boundary limit, a target torque, a drive torque limit and a generation torque limit. The control unit calculates a limit torque, reflecting the drive torque limit and the generation torque limit in response to a ratio of the current speed in the speed boundary section. Of the limit torque and the target torque, the control unit determines the torque that has the smaller absolute value as the final torque required of the drive motor.

Furthermore, the control unit calculates the limit torque, reflecting both the drive torque limit in proportion to a difference between the current speed and the lowest boundary limit, and the generation torque limit in proportion to a difference between the current speed and the uppermost boundary limit.

Furthermore, the present invention may be embodied as computer readable media on a computer readable medium containing executable program instructions executed by a processor, controller or the like, for example a motor control unit. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems, such as a telematics system, so that the computer readable media is stored and executed in a distributed fashion.

As described above, in the method, system and apparatus for controlling torque of an electric motor driven vehicle according to the present invention, even if a drive torque limit and a generation torque limit are subject to rapid change when it is required to charge or discharge a drive motor, the final torque required of the drive motor can be reliably calculated, thus, providing the driver with a smoother ride quality.

Furthermore, the limit torque is determined from between the drive torque limit and the generation torque limit. The speed rather than the torque is the criteria for the determination of the limit torque. Thus, even when the current speed of the electric motor is about 0, the final torque to be controlled can be prevented from being unstable.

Moreover, if a section of speed at which the final torque is unstable is set as a speed boundary section, an additional control method in addition to the conventional final torque control method can be used so that the final torque is generally linearly controlled.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling torque of an electric motor driven vehicle, comprising:
   receiving a current speed of a drive motor, a speed boundary section, a target torque, a drive torque limit and a generation torque limit;
   calculating a ratio of the current speed in the entire speed boundary section as a mixture ratio when the current speed is within the speed boundary section;
   calculating a limit torque, reflecting the drive torque limit and the generation torque limit in the calculated mixture ratio; and
   selecting whichever of the limit torque and the target torque is smaller in absolute value as a final torque that is required of the drive motor wherein the speed boundary section comprises a lowest boundary limit and an uppermost boundary limit, and the calculating of the ratio of the current speed comprises calculating the mixture ratio using equation 1:

$$\text{mixture ratio} = \frac{\text{current speed} \times \text{sgn(target torque)} - \text{lowest boundary limit value}}{\Delta \text{ speed boundary section}}$$

in which "sgn" is a mathematical expression that extracts the sign of the real target torque.

2. The method as set forth in claim 1, wherein the speed boundary section comprises a lowest boundary limit and an uppermost boundary limit, and the calculating of the limit torque comprises calculating the limit torque, reflecting the drive torque limit in proportion to a difference between the current speed and the lowest boundary limit and also reflecting the generation torque limit in proportion to a difference between the current speed and the uppermost boundary limit.

3. The method as set forth in claim 1, wherein the speed boundary section comprises a lowest boundary limit and an uppermost boundary limit, and the calculating of the limit torque comprises calculating the limit torque using equation 2:

limit torque=(mixture ratio×drive torque limit value)+
(1−mixture ratio)×(generation torque limit value).

4. The method as set forth in claim 1, wherein the selecting comprises calculating the final torque using equation 3:

final torque=MIN(limit torque,|target torque|)×sgn (target torque)

wherein "sgn" is a mathematical expression that extracts the sign of the real target torque.

5. The method as set forth in claim 1, wherein the speed boundary section comprises a lowest boundary limit and an uppermost boundary limit, the calculating of the ratio of the current speed comprises calculating the mixture ratio using equation 1, the calculating of the limit torque comprises calculating the limit torque using equation 2, and the selecting comprises calculating the final torque using equation 3, limit torque=(mixture ratio×drive torque limit value)+
(1−mixture ratio)×(generation torque limit value)     Equation 2 final torque=MIN(limit torque,|target torque|)=sgn (target torque)     Equation 3 wherein "sgn" is a mathematical expression that extracts the sign of the real target torque.

6. A method for controlling torque of an electric motor driven vehicle, comprising:
receiving a current speed of a drive motor, a speed boundary section having a lowest boundary limit and an uppermost boundary limit, a target torque, a drive torque limit and a generation torque limit;
calculating a limit torque, reflecting the drive torque limit and the generation torque limit in a ratio of the current speed in the speed boundary section; and
selecting whichever of the limit torque and the target torque is smaller in absolute value, as a final torque that is required of the drive motor wherein the calculating of the limit torque comprises calculating the limit torque, reflecting the drive torque limit in proportion to a difference between the current speed and the lowest boundary limit, and also reflecting the generation torque limit in proportion to a difference between the current speed and the uppermost boundary limit.

7. An apparatus for controlling torque of an electric motor driven vehicle, comprising:
a drive motor providing drive force to the electric motor driven vehicle; and
a control unit calculating a final torque required of the drive motor using a current speed of the drive motor, a speed boundary section including a lowest boundary limit and an uppermost boundary limit, a target torque, a drive torque limit and a generation torque limit,
wherein the control unit calculates a limit torque, reflecting the drive torque limit and the generation torque limit in response to a ratio of the current speed in the speed boundary section, and selects whichever of the limit torque and the target torque is smaller in absolute value as the final torque that is required of the drive motor wherein the control unit calculates the limit torque, reflecting the drive torque limit in proportion to a difference between the current speed and the lowest boundary limit, and also reflecting the generation torque limit in proportion to a difference between the current speed and the uppermost boundary limit.

8. A non transitory computer readable medium containing executable program instructions executed by a controller, comprising:
program instructions that input a current speed of a drive motor, a speed boundary section, a target torque, a drive torque limit and a generation torque limit which are received at the controller;
program instructions that calculate a ratio of the current speed in the entire speed boundary section as a mixture ratio when the current speed is within the speed boundary section;
program instructions that calculate a limit torque, reflecting the drive torque limit and the generation torque limit in the calculated mixture ratio; and
program instructions that select whichever of the limit torque and the target torque is smaller in absolute value as a final torque that is required of the drive motor wherein the speed boundary section comprises a lowest boundary limit and an uppermost boundary limit, and the program instructions that calculate the ratio of the current speed comprises program instructions that calculate the mixture ratio using equation 1:

$$\text{mixture ratio} = \frac{\text{current speed} \times \text{sgn(target torque)} - \text{lowest boundary limit value}}{\Delta \text{ speed boundary section}}$$

in which "sgn" is a mathematical expression that extracts the sign of the real target torque.

9. The computer readable medium as set forth in claim 8, wherein the speed boundary section comprises a lowest boundary limit and an uppermost boundary limit, and the program instructions that calculate the limit torque comprises program instructions that calculate the limit torque, reflecting drive torque limit in proportion to a difference between the current speed and the lowest boundary limit and also reflecting the generation torque limit in proportion to a difference between the current speed and the uppermost boundary limit.

10. The non transitory computer readable medium as set forth in claim 8, wherein the speed boundary section comprises a lowest boundary limit and an uppermost boundary limit, and the program instructions that calculate the limit torque comprises program instructions that calculate the limit torque using equation 2:

limit torque=(mixture ratio×drive torque limit value)+
(1−mixture ratio)×(generation torque limit value).

11. The non transitory computer readable medium as set forth in claim 8, wherein the selecting comprises calculating the final torque using equation 3:

final torque=MIN(limit torque,|target torque|)×sgn (target torque)

wherein "sgn" is a mathematical expression that extracts the sign of the real target torque.

12. The non transitory computer readable medium as set forth in claim 8, wherein the speed boundary section comprises a lowest boundary limit and an uppermost boundary limit, the program instructions that calculate the ratio of the current speed comprises program instructions that calculate the mixture ratio using equation 1, the program instructions that calculate the limit torque comprises calculating the limit torque using equation 2, and the program instructions that select comprises program instructions that calculate the final torque using equation 3, limit torque=(mixture ratio×drive torque limit value)+
(1−mixture ratio)×(generation torque limit value)

final torque=MIN(limit torque,|target torque|)×sgn(target torque)

wherein "sgn" is a mathematical expression that extracts the sign of the real target torque.

* * * * *